(12) United States Patent
Vemulapati et al.

(10) Patent No.: US 10,946,796 B2
(45) Date of Patent: Mar. 16, 2021

(54) OVERHEAD CONSOLE BUTTON CARRIER HAVING A UNITARY BODY

(71) Applicant: FORD GLOBAL TECHNOLOGIES, LLC, Dearborn, MI (US)

(72) Inventors: Satyanarayana Raju Vemulapati, Westland, MI (US); Todd Jared Konet, Canton, MI (US); Derren Woods, Ann Arbor, MI (US); Wei Xu, Nanjing (CN); Alex Lince, St. Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 15/977,416

(22) Filed: May 11, 2018

(65) Prior Publication Data

US 2019/0344708 A1    Nov. 14, 2019

(51) Int. Cl.
*B60Q 3/51* (2017.01)
*B60R 11/00* (2006.01)
(Continued)

(52) U.S. Cl.
CPC ........... *B60Q 3/51* (2017.02); *B29C 45/14* (2013.01); *B29C 45/2628* (2013.01);
(Continued)

(58) Field of Classification Search
CPC ............ G02B 27/30; G02B 19/0014; G02B 19/0028; G02B 27/0966; G02B 5/045; G02B 19/0057; G02B 19/0052; G02B 27/0025; G02B 27/0961; G02B 5/04; G02B 2027/0123; G02B 27/0172; G02B 2027/011; G02B 2027/0116; G02B 2207/123; G02B 27/0101; G02B 27/0905; G02B 27/0927; G02B 27/1006; G02B 27/283; H01S 5/005; H01S 5/02288; H01S 5/4012; H01S 5/02248; H01S 5/4025; H01S 3/005; H01S 5/02208; H01S 5/02284;
(Continued)

(56) References Cited

U.S. PATENT DOCUMENTS 4,133,405 A    1/1979  Turek
6,286,972 B1 *  9/2001  Shepherd ............... H01H 13/70
                                                              362/234
(Continued)

FOREIGN PATENT DOCUMENTS

EP    3018560 A1    6/2010
JP    2011230565 A1  11/2011
WO   2006020782 A2   2/2006

OTHER PUBLICATIONS

English Machine Translation of JP2011230565A.

*Primary Examiner* — William R Alexander
*Assistant Examiner* — Sharrief I Broome
(74) *Attorney, Agent, or Firm* — David Copiellie; King & Schickli, PLLC

(57) ABSTRACT

An overhead console button carrier has a unitary body. That unitary body includes a first light collimator, a second light collimator, a first intrusion sensor bracket, a second intrusion sensor bracket, a third intrusion sensor bracket and a plurality of button guides. A method and mold assembly for making the overhead console button carrier is also provided.

11 Claims, 6 Drawing Sheets

(51) Int. Cl.

| | | |
|---|---|---|
| *B60Q 3/20* | (2017.01) | |
| *B29C 45/14* | (2006.01) | |
| *B29C 45/40* | (2006.01) | |
| *B29C 45/26* | (2006.01) | |
| *B29L 31/00* | (2006.01) | |
| *G02B 7/00* | (2006.01) | |
| *G02B 27/30* | (2006.01) | |
| *B29L 11/00* | (2006.01) | |
| *B29L 31/30* | (2006.01) | |
| *G05G 1/02* | (2006.01) | |

(52) U.S. Cl.
CPC ............... *B29C 45/40* (2013.01); *B60Q 3/20* (2017.02); *B60R 11/00* (2013.01); *B29L 2011/00* (2013.01); *B29L 2031/30* (2013.01); *B29L 2031/7502* (2013.01); *B60R 2011/0003* (2013.01); *B60R 2011/0045* (2013.01); *G02B 7/00* (2013.01); *G02B 27/30* (2013.01); *G05G 1/02* (2013.01)

(58) Field of Classification Search
CPC ............... H01S 5/423; H01S 3/094053; H01S 3/09415; H01S 3/1611; H01S 5/0071; H01S 5/02212; H01S 5/02252; H01S 5/02296; H01S 5/0687; H01S 5/4031; H01S 5/405; H01S 2301/203; B23K 2103/50; B23K 26/0648; B23K 26/0665; B23K 26/38; B23K 2103/08; B23K 2103/12; B23K 2103/18; B23K 26/04; B23K 26/046; B23K 26/06; B23K 26/066; B23K 26/1476; B23K 26/21; B23K 26/382; B23K 26/384; B23K 26/40; B23K 26/402; B23K 26/702; B23K 26/707

See application file for complete search history.

(56) References Cited

U.S. PATENT DOCUMENTS

| | | | |
|---|---|---|---|
| 2010/0133410 A1 | 6/2010 | Gruener et al. | |
| 2012/0140126 A1* | 6/2012 | Werth | B60R 11/0264 348/837 |
| 2013/0193314 A1* | 8/2013 | Schweninger | H03K 17/78 250/214 SW |
| 2015/0353005 A1* | 12/2015 | Hodgson | B60Q 3/82 345/156 |
| 2017/0072862 A1* | 3/2017 | Arendsen | B60Q 3/51 |

\* cited by examiner

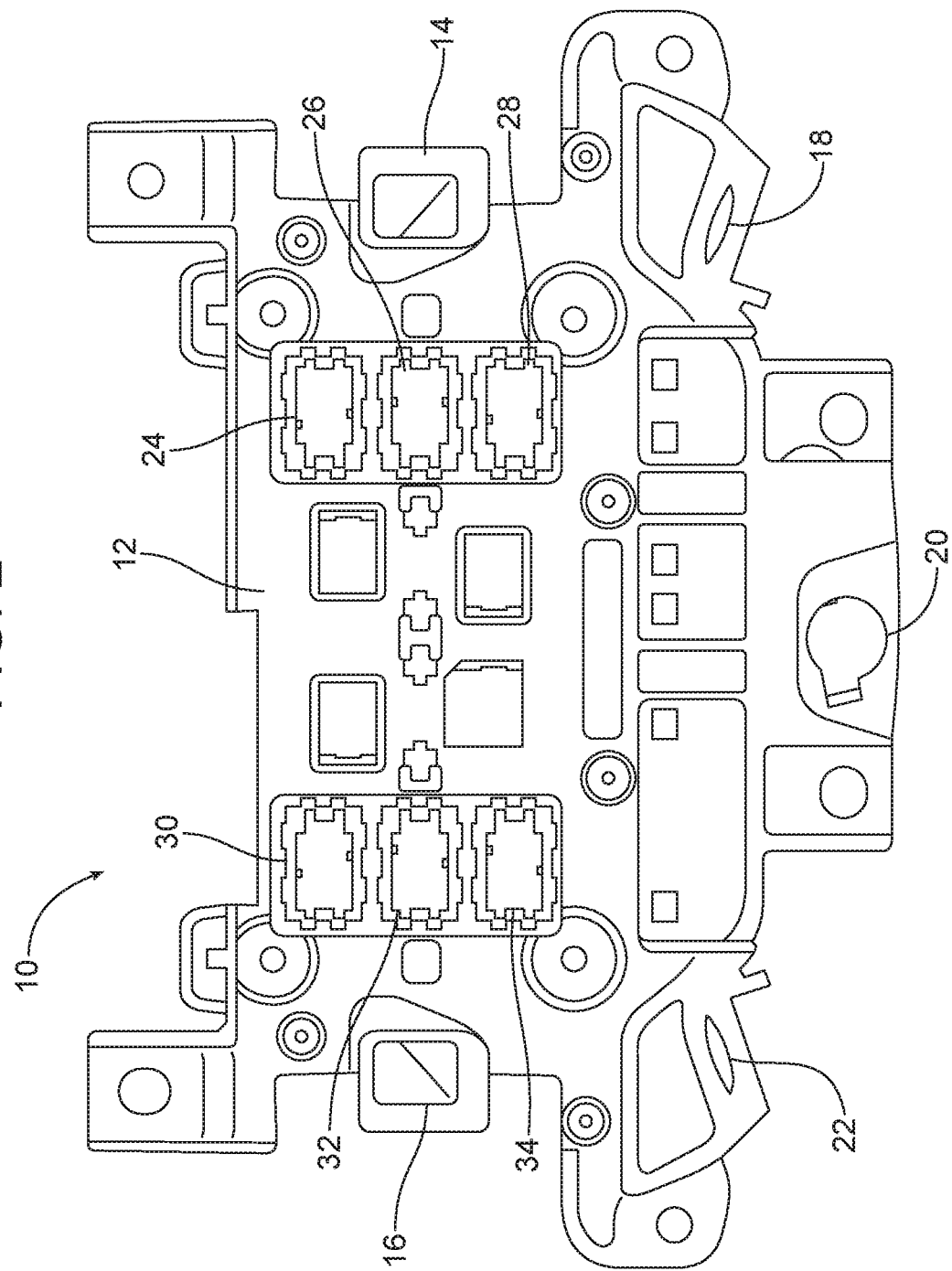

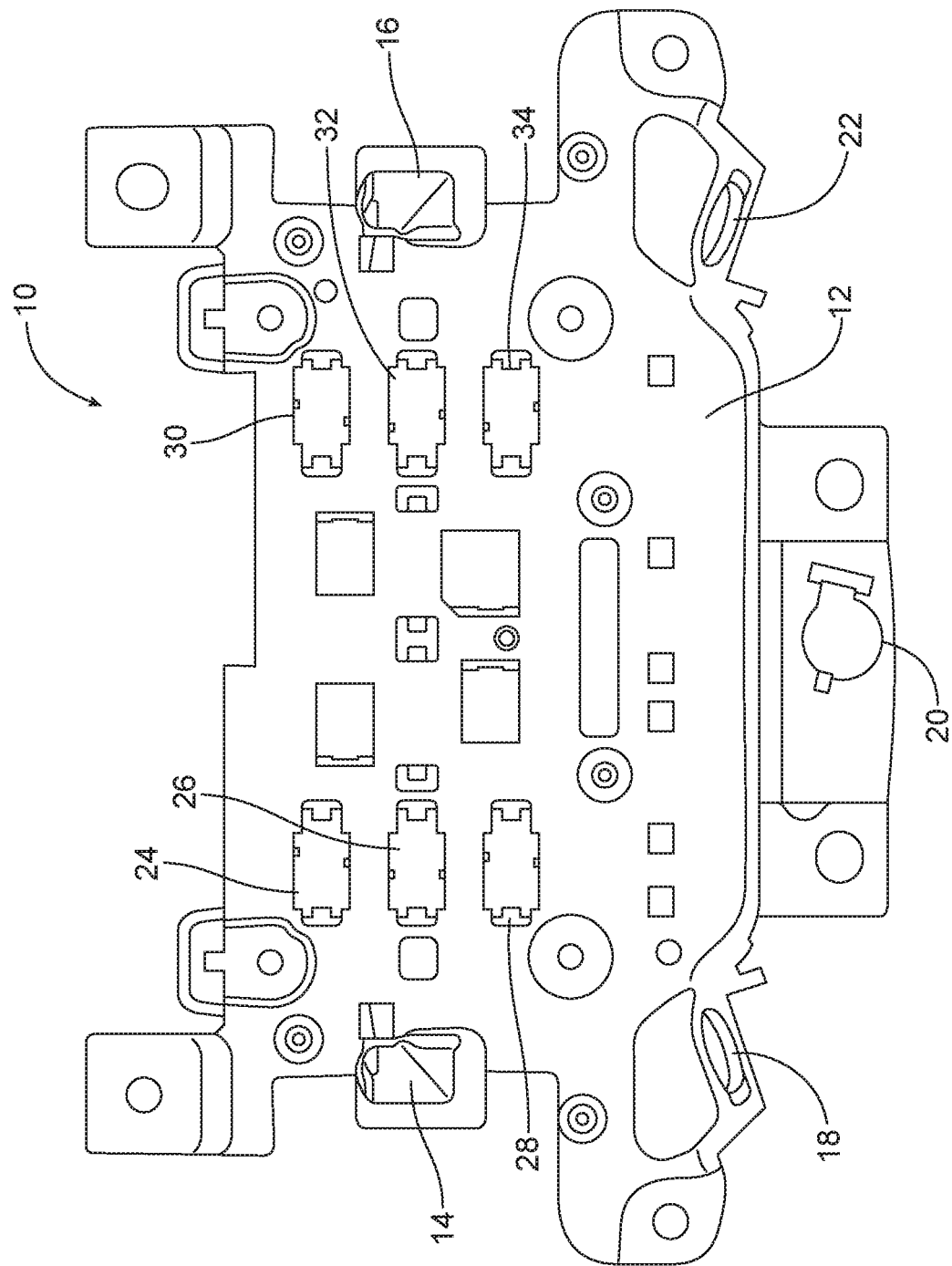

OVERHEAD CONSOLE BUTTON CARRIER HAVING A UNITARY BODY

TECHNICAL FIELD

This document relates generally to the motor vehicle equipment field and, more particularly, to a new and improved overhead console button carrier that has a unitary body as well as to a method of making that overhead console button carrier and to a mold assembly for that purpose.

BACKGROUND

An overhead console button carrier is a relatively complex component that functions to retain push buttons and other components such as right hand and left hand collimators and various intrusion sensors. In the past it has been necessary to assemble the overhead console button carrier from multiple parts. Such a manufacturing approach has required multiple mold tools, associated fasteners, and assembly labor all adding to the cost of producing an overhead console button carrier.

This document relates to a new and improved overhead console button carrier having a unitary body that includes one or more light collimators, one or more intrusion sensor brackets as well as one or more zero draft button guides. For purposes of this document, the terminology "unitary body" refers to a body originally manufactured in one piece and not requiring assembly from multiple component parts. Advantageously, an overhead console button carrier incorporating a unitary body substantially reduces the complexity and costs of production and, therefore, represents a significant advance in the art.

SUMMARY

In accordance with the purposes and benefits as described herein, a new and improved overhead console button carrier is provided. That overhead console button carrier comprises a unitary body including a first light collimator, a first intrusion sensor bracket and a first button guide.

The overhead console button carrier may also include a second light collimator. The overhead console button carrier may also include a second intrusion sensor bracket. The overhead console button carrier may also include a third intrusion sensor bracket. The overhead console button carrier may also include a plurality of button guides.

The first button guide may have a first centerline axis oriented along a first direction vector. The first light collimator may have a second centerline axis oriented along a second direction vector different from the first direction vector. The second light collimator may have a third centerline axis oriented along a third direction vector different from the first and second direction vectors.

The first intrusion sensor bracket may have a fourth centerline axis oriented along a fourth direction vector different from the first, second and third direction vectors. The second intrusion sensor bracket may have a fifth centerline axis oriented along a fifth direction vector different from the first, second, third and fourth direction vectors. The third intrusion sensor bracket may have a sixth centerline axis oriented along a sixth direction vector different from the first, second, third, fourth and fifth direction vectors.

In accordance with an additional aspect, a method is provided for making an overhead console button carrier having a unitary body. That method includes the steps of closing a mold assembly, injecting plastic into the mold assembly, forming the overhead console button carrier as a unitary body including a first light collimator, a first intrusion sensor bracket and a first button guide, opening the mold assembly and removing the overhead console button carrier from the mold assembly.

The method may further include the step of forming the unitary body with a second light collimator, a second intrusion sensor bracket and a third intrusion sensor bracket before opening the mold assembly. Further, the method may include the step of using a zero draft core insert to form the first button guide. Additional zero draft core inserts may be utilized to form additional button guides if desired or needed for any particular application.

Still further, the method may include the step of using a first core side buried retractor mechanism to form the first light collimator. Further, the method may include the step of using a second core side buried retractor mechanism to form the second light collimator.

In addition, the method may include the step of using a first slide mechanism, carried on a core side of the mold assembly, to form the first intrusion sensor bracket. The method may include the step of using a second slide mechanism, carried on the core side of the mold assembly, to form the second intrusion sensor bracket. The method may include the step of using a third slide mechanism, carried on the core side of the mold assembly, to form the third intrusion sensor bracket.

In accordance with still another aspect, a new and improved mold assembly is provided. That mold assembly may be adapted for producing an overhead console button carrier having a unitary body. The mold assembly comprises a cavity side and a core side. The core side includes at least one zero draft core insert, a first buried retractor mechanism and a first slide mechanism.

Further, the core side of the mold assembly may further include a second buried retractor mechanism. The core side of the mold assembly may further include a second slide mechanism. The core side of the mold assembly may include a third slide mechanism.

In the following description, there are shown and described several preferred embodiments of the overhead console button carrier, the method of making an overhead console button carrier and a mold assembly that may be utilized to make the overhead console button carrier. As it should be realized, the overhead console button carrier, the method and the mold assembly are capable of other, different embodiments and their several details are capable of modification in various, obvious aspects all without departing from the overhead console button carrier, the method and the mold as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the overhead console button carrier, the related method and the mold assembly and together with the description serve to explain certain principles thereof.

FIG. 2 is a top plan view of the overhead console button carrier illustrated in

FIG. 1.

Figure 1:
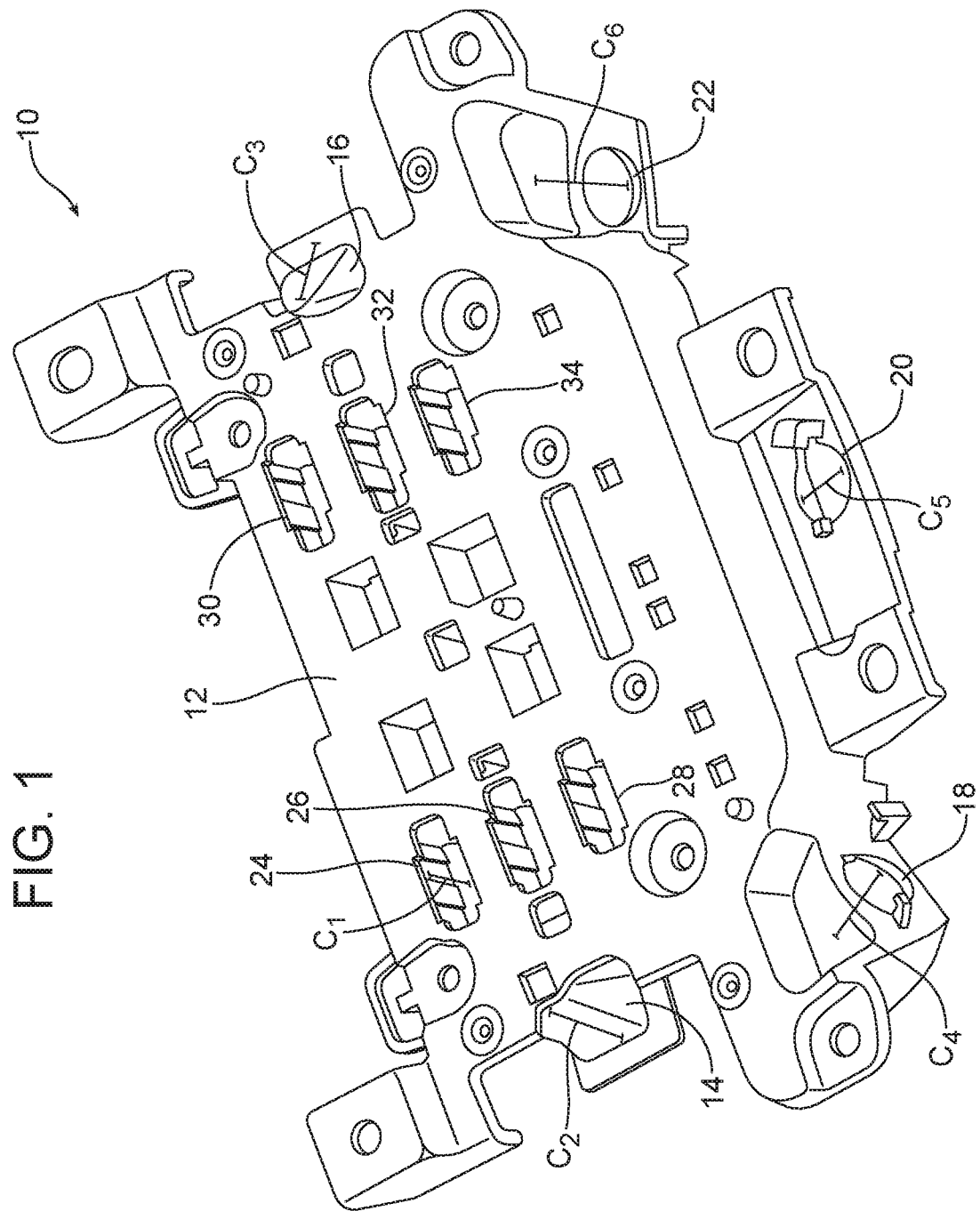
FIG. 1 is a perspective view of the overhead console button carrier having a unitary body.

FIG. 3 is a bottom plan view of the overhead console button carrier illustrated in FIGS. 1 and 2.

Figure 4A:
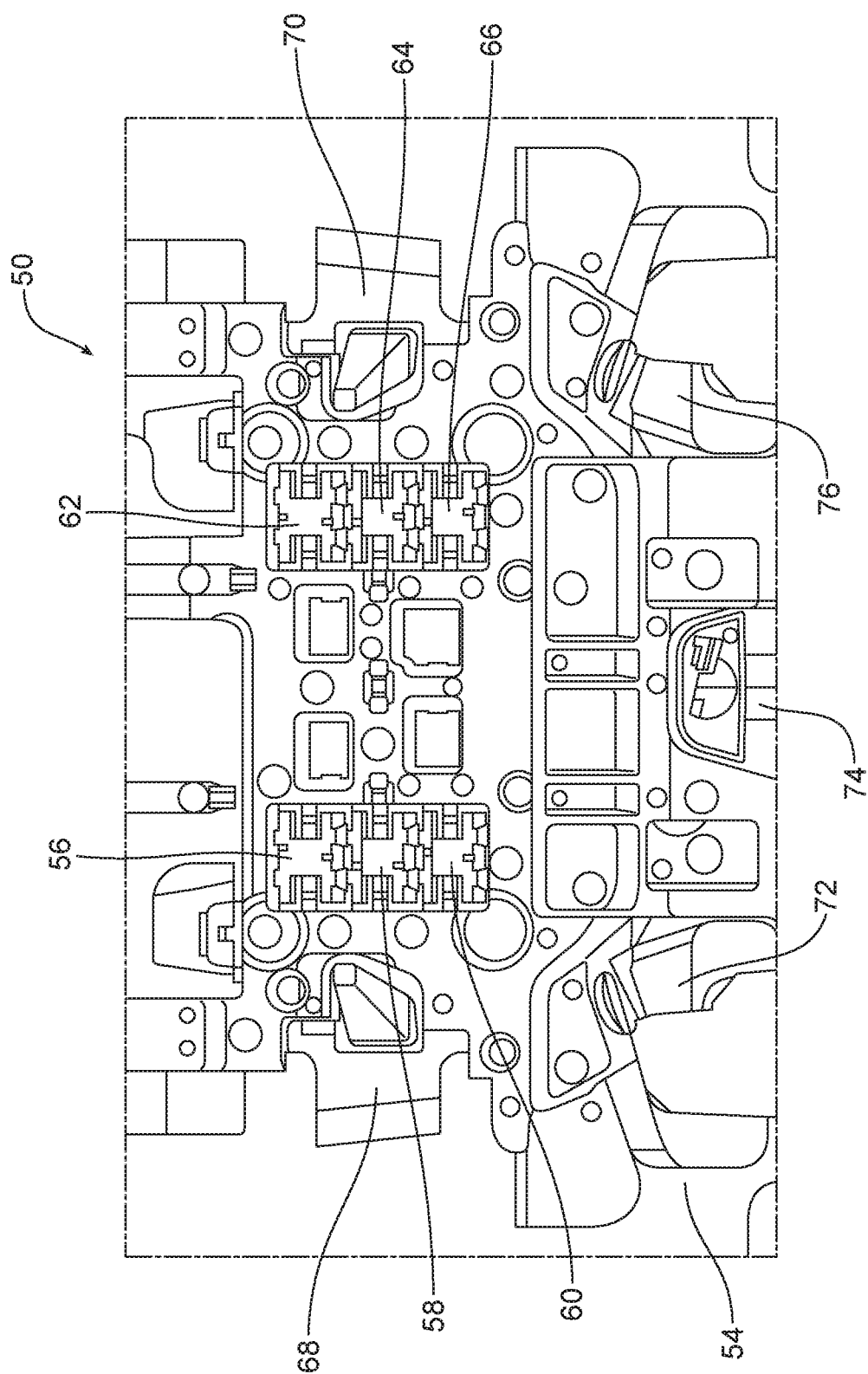

FIG. 4a is a top plan view of the core side of the mold assembly that is utilized to mold the overhead console button carrier illustrated in FIGS. 1-3.

Figure 4B:
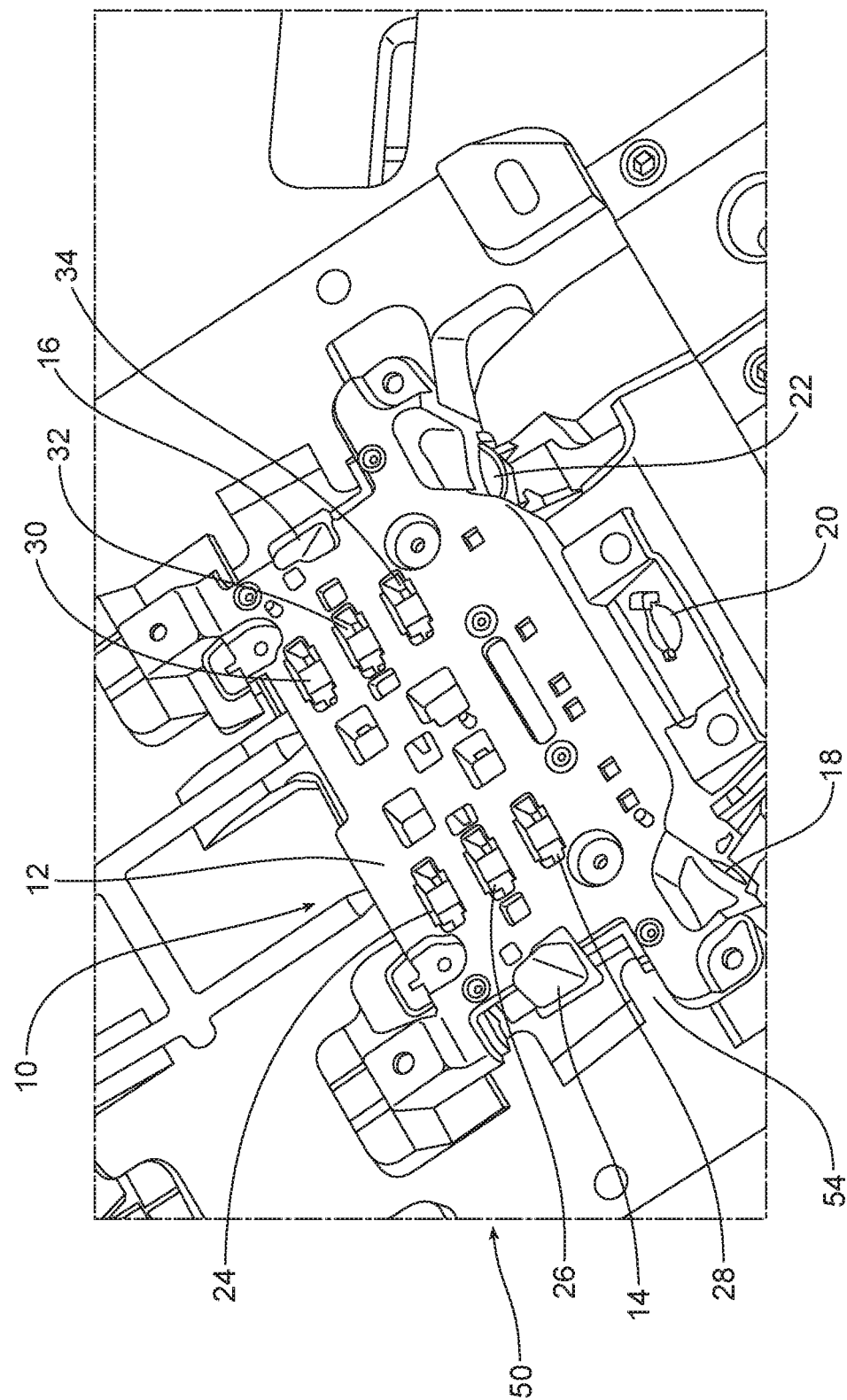

FIG. 4b is a top plan view of the finished overhead console button carrier resting in the core side of the mold assembly illustrated in FIG. 4a following molding.

Figure 5:
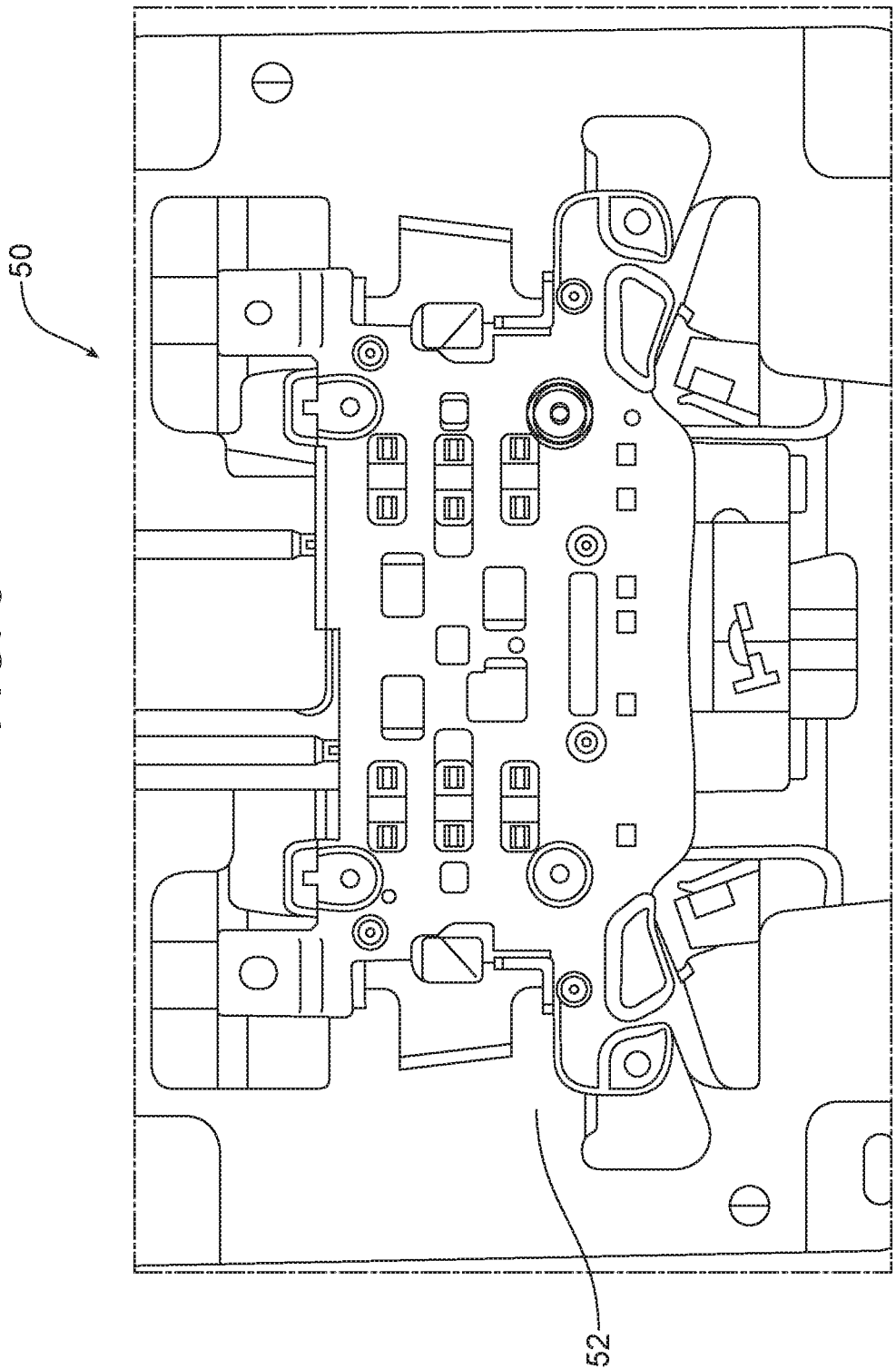

FIG. 5 is a top plan view of the cavity side of the mold assembly utilized to make the overhead console button carrier illustrated in FIGS. 1-3.

Reference will now be made in detail to the present preferred embodiments of the overhead console button carrier, the method of making that overhead console button carrier and the mold assembly for making that overhead console button carrier, examples of which are illustrated in the accompanying drawing figures.

DETAILED DESCRIPTION

Reference is now made to FIGS. 1-3 illustrating the new and improved overhead console button carrier 10. That overhead console button carrier 10 includes a unitary body 12. That unitary body 12 is directly molded in one piece rather than being assembled from a plurality of component parts. As a result, the overhead console button carrier 10 may be produced in a simple and inexpensive manner (not previously thought possible) while still allowing for complex functionality.

In the illustrated embodiment, the unitary body 12 includes a first light collimator 14, a second light collimator 16, a first intrusion sensor bracket 18, a second intrusion sensor 20, a third intrusion sensor bracket 22 and a first button guide 24. Still further, the unitary body 12 further includes a second button guide 26, a third button guide 28, a fourth button guide 30, a fifth button guide 32 and a sixth button guide 34. Each of the button guides 24, 26, 28, 30, 32, 34 includes zero draft to insure the proper operation of any push buttons subsequently incorporated therein that are adapted for operation of various electrical systems of a motor vehicle into which the overhead console button carrier 10 is incorporated.

As illustrated in FIGS. 1-3, the first button guide 24 has a first centerline axis C1 that is oriented along a first direction vector. The second, third, fourth, fifth and sixth button guides 26, 28, 30, 32, 34 also have their own unique centerline axes oriented parallel to the first centerline axis C1. The first light collimator 14 has a second centerline axis C2 oriented along a second direction vector different from the first direction vector. The second light collimator 16 has a third centerline axis C3 oriented along a third direction vector different from the first and second direction vectors.

The first intrusion sensor bracket 18 has a fourth centerline axis C4 oriented along a fourth direction vector different from the first, second and third direction vectors. The second intrusion sensor bracket 20 has a fifth centerline axis C5 oriented along a fifth direction vector different from the first, second, third and fourth direction vectors. Finally, the third intrusion sensor bracket 22 has a sixth centerline axis C6 oriented along a sixth direction vector different from the first, second, third, fourth and fifth direction vectors.

Reference is now made to FIGS. 4a, 4b and 5 which illustrate the mold assembly 50 utilized to make the overhead console button carrier 10. That mold assembly 50 includes a cavity side 52 and a core side 54. The core side 54 includes at least one zero draft core insert 56. More particularly, in the illustrated embodiment, the core side 54 includes the first zero draft insert 56, a second zero draft core insert 58, a third zero draft core insert 60, a fourth zero draft core insert 62, a fifth zero draft core insert 64 and a sixth zero draft core insert 66.

The first zero draft core insert 56 forms the first button guide 24. The second zero draft core insert 58 forms the second button guide 26. The third zero draft core insert 60 forms the third button guide 28. The fourth zero draft core insert 62 forms the fourth button guide 30. The fifth zero draft core insert 64 forms the fifth button guide 32. Finally, the sixth zero draft core insert 66 forms the sixth button guide 34. All of the button guides 24, 26, 28, 30, 32, 34 have their own centerline axis offset from and parallel to each of the others.

The core side 54 also includes a first buried retractor mechanism 68 and a second buried retractor mechanism 70. Further, the core side 54 includes a first slide mechanism 72, a second slide mechanism 74 and a third slide mechanism 76. The first buried retractor mechanism 68 forms the first light collimator 14. The second buried retractor mechanism 70 forms the second light collimator 16. The first slide mechanism 72 forms the first intrusion sensor bracket 18. The second slide mechanism 74 forms the second intrusion sensor bracket 20. The third slide mechanism 76 forms the third intrusion sensor bracket 22.

Retractor mechanisms, 68, 70 and slide mechanisms 72, 74, 76 of the type utilized in the mold assembly 50 described herein are available from various manufacturers/suppliers of mold assemblies including, for example, Broadway Precision Technology Limited of China with production facilities in Shenzhen, China. While such retractor mechanisms 68, 70 and slide mechanisms 72, 74, 76 are known to those skilled in the art of mold design, it is believed that the present mold assembly 50 is the first to incorporate retractor mechanisms and slide mechanism with one or more zero draft core inserts 56, 58, 60, 62, 64, 66. It is the unique and novel combination of the actions provided by the retractor mechanisms 68, 70 and the slide mechanisms 72, 74, 76 with the zero draft core inserts 56, 58, 60, 62, 64, 66 that allows the consolidation of the overhead console button carrier 10 into a unitary body 12.

It is the synergistic combination of actions provided by the first and second buried retractor mechanisms 68, 70, and the first, second and third slide mechanisms 72, 74, 76 in combination with the zero draft inserts 56, 58, 60, 62, 64, 66 that allows for the complex structure of the overhead console button carrier 10 to be manufactured with a unitary body 12 that fully functions to orient the button guides 24, 26, 28, 30, 32, 34 to receive and allow for proper operation of push buttons, the first and second light collimators 14, 16 to receive and allow for proper operation and function of map lights and the first, second and third intrusion sensor brackets 18, 20, 22 to receive and allow for proper operation and function of intrusion sensors oriented along specific direction vectors as required for proper and effective operation.

The method of making the overhead console button carrier 10 comprises the steps of: (a) closing the mold assembly 50, (b) injecting plastic into the mold assembly, (c) forming the overhead console button carrier 10 as a unitary body 12 including a first light collimator 14, a first intrusion sensor bracket 18 and a first button guide 24, (d) opening the mold assembly and (e) removing the overhead console button carrier 10 from the mold assembly.

The method may further include the step of forming the unitary body 12 with a second light collimator 16, a second intrusion sensor bracket 20 and a third intrusion sensor bracket 22 before opening the mold assembly. In addition the method may include using a zero draft core insert 56 to form the first button guide 24.

A second zero draft core insert 58 may be utilized to form the second button guide 26. A third zero draft core insert 60 may be utilized to form the third button guide 28. A fourth zero draft core insert 62 may be utilized to form the fourth button guide 30. A fifth zero core draft insert 64 may be utilized to form the fifth button guide 32. A sixth zero draft core insert 66 may be utilized to form the sixth button guide 34. All zero draft core inserts 56, 58, 60, 62, 64, 66 are offset from and parallel to one another, perpendicular to the mold assembly part line.

The method may include utilizing the first core side buried retractor mechanism 68 to form the first light collimator 14. The method may include utilizing the second core side buried retractor mechanism 70 to form the second light collimator.

The method may include using the first slide mechanism 72, carried on the core side 54 of the mold assembly 50, to form the first intrusion sensor bracket 18. The method may include using the second slide mechanism 74, carried on the core side 54 of the mold assembly 50, to form the second intrusion sensor bracket 20. Further the method may include using the third slide mechanism 76, carried on the core side 54 of the mold assembly 50, to form the third intrusion sensor bracket 22.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An overhead console button carrier, comprising:
   a unitary body manufactured in one piece rather than being assembled from a plurality of component parts, including a first light collimator, a first intrusion sensor bracket and a first button guide.

2. The overhead console button carrier of claim 1, further including a second light collimator.

3. The overhead console button carrier of claim 2, further including a second intrusion sensor bracket.

4. The overhead console button carrier of claim 3, further including a third intrusion sensor bracket.

5. The overhead console button carrier of claim 4, wherein said first button guide has a first centerline axis oriented along a first direction vector.

6. The overhead console button carrier of claim 5, wherein said first light collimator has a second centerline axis oriented along a second direction vector different from said first direction vector.

7. The overhead console button carrier of claim 6, wherein said second light collimator has a third centerline axis oriented along a third direction vector different from said first and second direction vectors.

8. The overhead console button carrier of claim 7, wherein said first intrusion sensor bracket has a fourth centerline axis oriented along a fourth direction vector different from said first, second and third direction vectors.

9. The overhead console button carrier of claim 8, wherein said second intrusion sensor bracket has a fifth centerline axis oriented along a fifth direction vector different from said first, second, third and fourth direction vectors.

10. The overhead console button carrier of claim 9, wherein said third intrusion sensor bracket has a sixth centerline axis oriented along a sixth direction vector different from said first, second, third, fourth and fifth direction vectors.

11. The overhead console button carrier of claim 1, wherein the first light collimator, the first intrusion sensor bracket and the first button guide have different centerline axes oriented along different direction vectors.

* * * * *